United States Patent

Durst et al.

Patent Number: 5,514,195
Date of Patent: May 7, 1996

[54] FILTER HOUSING

[76] Inventors: Michael Durst, Amselweg 19, 74586 Frankenhardt-Honhardt; Max Müller, Panoramaweg 27, 74594 Kressberg; Manfred Schnell, Am Wiesenbach 33/3, 74564 Crailsheim; Rudolf Schulze-Dieckhoff, Flurstrasse 61, 88045 Fürth; Gerd Minzenbach, Beethovenstrasse 53, 68723 Oftersheim, all of Germany

[21] Appl. No.: 318,895

[22] PCT Filed: Apr. 14, 1993

[86] PCT No.: PCT/EP93/00901

§ 371 Date: Oct. 7, 1994

§ 102(e) Date: Oct. 7, 1994

[87] PCT Pub. No.: WO93/20924

PCT Pub. Date: Oct. 28, 1993

[30] Foreign Application Priority Data

Apr. 16, 1992 [DE] Germany .................... 42 12 769.6

[51] Int. Cl.⁶ .................................................. B01D 29/88
[52] U.S. Cl. ............... 55/302; 55/344; 55/350.1; 55/419
[58] Field of Search ............... 55/418, 419, 302, 55/523, 321, 429, 344, 350.1

[56] References Cited

U.S. PATENT DOCUMENTS

| | | | |
|---|---|---|---|
| 3,464,189 | 9/1969 | Mergenthaler | 55/419 X |
| 3,865,561 | 2/1975 | Osborn | 55/419 X |
| 3,923,480 | 12/1975 | Visch | 55/321 X |
| 4,509,963 | 4/1985 | Jackson | 55/429 X |
| 4,854,951 | 8/1989 | Stephenson | 55/302 X |
| 4,865,627 | 9/1989 | Dewitz et al. | 55/302 X |
| 4,872,981 | 10/1989 | Hobson, Jr. | 55/418 X |
| 5,167,676 | 12/1992 | Nakaishi et al. | 55/302 X |

FOREIGN PATENT DOCUMENTS

| | | |
|---|---|---|
| 314253 | 5/1989 | European Pat. Off. . |
| 2244559 | 4/1975 | France . |
| 3803561 | 8/1989 | Germany . |
| 4029395 | 3/1992 | Germany . |

*Primary Examiner*—Richard L. Chiesa
*Attorney, Agent, or Firm*—Shenier & O'Connor

[57] ABSTRACT

Apparatus for filtering solid particles suspended in a gas includes a housing divided by a plate into an upper clean gas chamber and a lower polluted gas chamber. Depending filter elements are secured to apertures in the plate. Polluted gas flows to a distributor, in the lower chamber below the filter elements, to which is coupled a plurality of vertically disposed pipes extending upwardly past the filter elements to outlets disposed in the vicinity of the plate. The upward discharge from these outlets is then deflected downwardly past the filter elements.

14 Claims, 2 Drawing Sheets

FILTER HOUSING

The invention relates to a filter housing for separating a two-phase mixture consisting of gaseous and solid components, which is divided by a rigid plate provided with openings into a raw gas chamber located at the bottom and a clean gas chamber located at the top above the raw gas chamber, whereby filter elements leading downwards into the raw gas chamber are secured in the openings of the rigid plate, a two-phase flow is introduceable into the raw gas chamber, the clean gas chamber has an outlet located above the filter elements for the gaseous components of the flow freed from the solid components by the filter elements and cleaning devices are associated with the filter elements for flushing out the filter elements.

In filter housings of the specified type (DE-A1-40 29 395; FR-A1-22 44 559), it is important for the two-phase flow to reach the individual filter elements in a uniform manner, for turbulences of the flow to be reduced to a minimum and the flow velocity to have, as far as possible, more or less the same values throughout the filter housing.

This is particularly important for the cleaning of the filter elements by means of a gas pressure pulse directed contrary to the two-phase flow. Such cleaning normally takes place during the operation of the filter housing, whereby the gas pressure pulse is merely applied to some of the filter elements while the remaining filter elements can continue to exercise their filtering function undisturbed. When the solids (dust) which are thereby separated from the filter elements and fall downwards are picked up by the two-phase flow still prevailing in the housing and directed essentially upwards, they will be whirled about, and an undesired resoiling of the filter elements can easily occur.

For this reason, attempts have already been made by using baffle plates, inclined introduction of the two-phase flow into the filter housing, flow distributors and the like to guide the two-phase flow entering the raw gas chamber such that it is, as far as possible, directed in the same direction with the falling dust and prevents this from resoiling the filter elements. Such a "uniform flow guidance" of raw gas and falling dust can be adjusted in a relatively uncomplicated manner in small filter housings having less filter elements. In the case of large filter housings with numerous filter elements, high volume throughputs and/or high pressure losses and dust loads, the problem of resoiling has not so far been solved satisfactorily.

The object of the invention is to design a generic device such that the two-phase flow entering the raw gas chamber of the filter housing is directed essentially downwards and guides dust falling from the filter elements towards the floor of the filter housing.

The object is accomplished in accordance with the invention, in a generic filter housing, in that a pipe system extending at least partially in the interior of the raw gas chamber and branching between the filter elements is provided for receiving the two-phase flow, the pipe system dividing the two-phase flow into at least two partial streams and guiding these partial streams past the filter elements upwards as far as the vicinity of the rigid plate where the partial streams exit through openings out of the pipe system into the raw Gas chamber, and that deflecting means are arranged in the raw Gas chamber in the vicinity of the point of exit of the partial streams out of the pipe system, these deflecting means deflecting the partial streams in the raw Gas chamber freely downwards.

BRIEF DESCRIPTION OF THE DRAWINGS

The following description of a preferred embodiment of the invention serves to explain the invention further in conjunction with the attached drawings. In the drawings.

DESCRIPTION OF THE PREFERRED EMBODIMENTS

Figure 1:
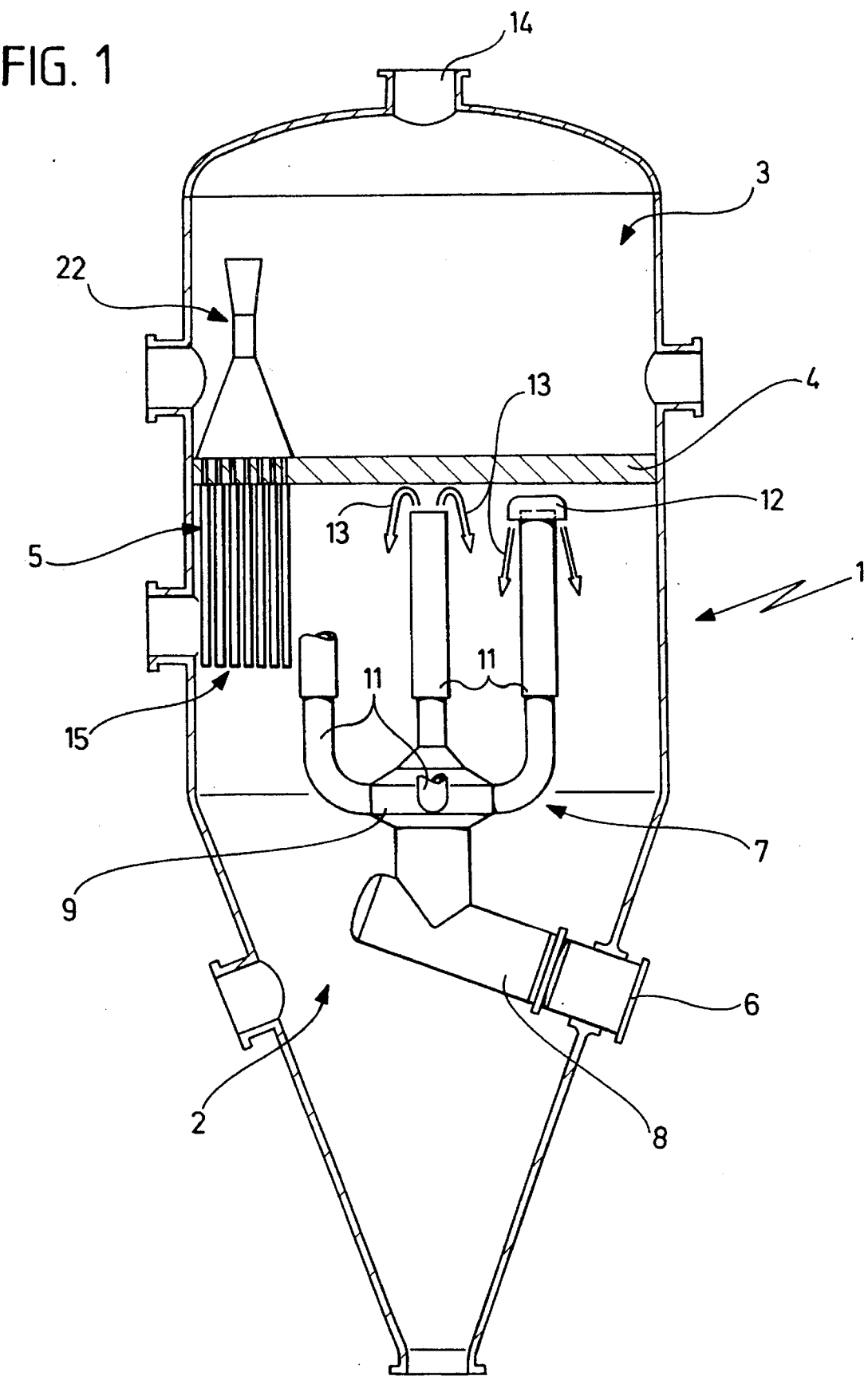
FIG. 1 shows schematically a filter housing with a pipe system serving to introduce a two-phase flow.

The filter housing 1 of a conventional constructional type illustrated schematically in FIG. 1 comprises a funnel-shaped raw gas chamber 2 located at the bottom and serving to separate dust and a clean gas chamber 3 located above it, these two chambers being separated from one another by a rigid plate 4. The plate 4 serves to support filter elements 5 which, in the illustrated case, are designed as downwardly hanging filter cartridges made of a ceramic material. The filter elements 5 are arranged in openings in the rigid plate 4 so that a gas from the raw gas chamber 2 can flow through the filter elements 5 into the clean gas chamber 3.

The raw gas chamber 2 has in a conventional manner an inlet 6 located below the filter elements 5 for a two-phase flow consisting of gaseous and solid components, for example a hot gas mixed with dust and soot particles or the like. As illustrated, a pipe system 7 located in the interior of the raw gas chamber 2 is connected to the inlet 6 and this pipe system comprises a central pipe 8, a distributor 9 connected thereto and individual pipes 11 proceeding upwards from this. In the illustrated embodiment, a total of five, upwardly directed individual pipes 11 project symmetrically from the distributor 9, only four of these being indicated in FIG. 1. The fifth individual pipe is located behind the central individual pipe 11. The individual pipes 11 are open at their ends located at the top in the vicinity of the underside of the rigid plate 4. The two-phase flow entering through the inlet 6 branches via the central pipe 8 and the distributor 9 into partial streams flowing through the individual pipes 11. These partial streams are conveyed by the individual pipes 11 past the filter elements 5 upwards as far as the vicinity of the plate 4 where they exit out of the open ends of the pipes 11 into the raw gas chamber 2. In this respect, the partial streams are, as illustrated in FIG. 1 at the central individual pipe 11, deflected downwardly by the underside of the plate 4 acting as a baffle surface so that the direction of flow of the raw gas is now turned parallel to the filter elements 5 downwards to the floor of the raw gas chamber 2.

Instead of deflecting the partial streams exiting from the individual pipes 11 directly by the plate 4, caps 12 covering the open ends of the individual pipes 11 can also be used as deflecting means and these caps act as baffle plates. In any case, a raw gas flow—indicated in FIG. 1 by the arrows 13—results and this is directed exclusively downwards along the elongated, cartridge-like or hose-like filter elements 5.

Due to the partial streams of raw gas which are first of all directed exclusively downwards in the interior of the raw gas chamber 2, it is possible for dust falling from the filter elements 5 to be taken along with these partial streams downwards where it collects on the floor of the raw gas chamber 2. A "resoiling" of the filter elements 5 cannot, therefore, occur, such as happens normally when the raw gas flows from the inlet 6 directly upwards in the direction towards the plate 4 and to the filter elements 5.

The raw gas which exits first of all at a relatively high velocity from the individual pipes 11 and flows downwards gradually decreases its velocity, reverses its direction and flows via the filter elements 5 and the openings in the plate 4 associated with these upwards into the clean gas chamber 3, whereby solid components of the raw gas are retained by the filter elements 5. The cleaned gas finally flows out of the clean gas chamber 3 through an outlet 14 arranged above the filter elements 5.

Figure 3:
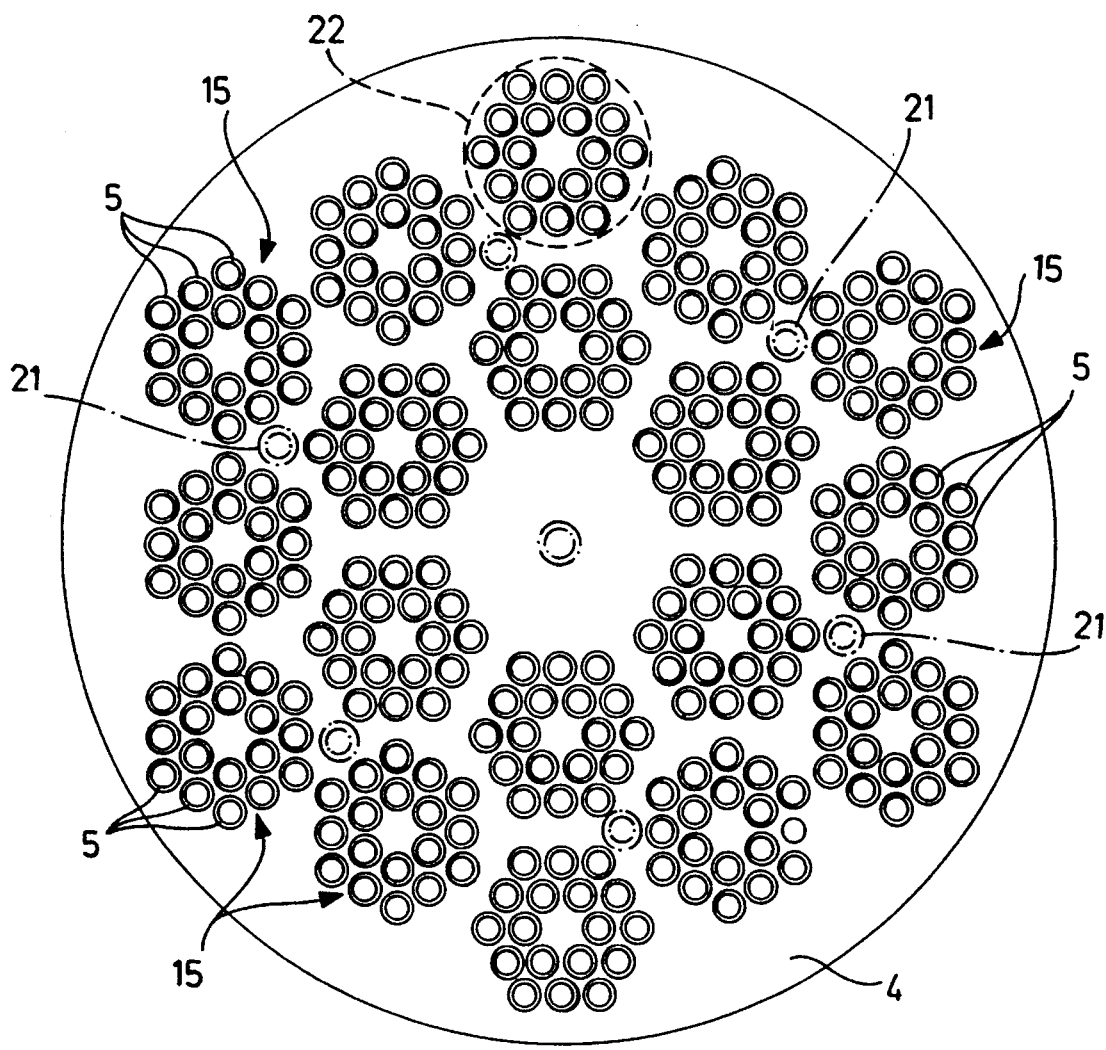
FIG. 3 shows schematically a rigid plate provided with openings for supporting filter elements, whereby the filter elements are combined in groups to form segments.

FIG. 3 shows schematically a bottom view of the plate 4. The individual, elongated filter elements 5 are combined into respective groups to form bundles or segments 15 which, for their part, are distributed over the surface of the plate 4 leaving "alleys" or intermediate spaces free. The individual pipes 11 of the pipe system 7 which are directed vertically upwards are arranged in these spaces. In this way, the incoming raw gas can be distributed uniformly to the individual filter elements 5 so that these can exercise their filtering function uniformly. (For the sake of clarity, only one single segment 15 consisting of filter elements 5 is illustrated in FIG. 1).

Figure 2:
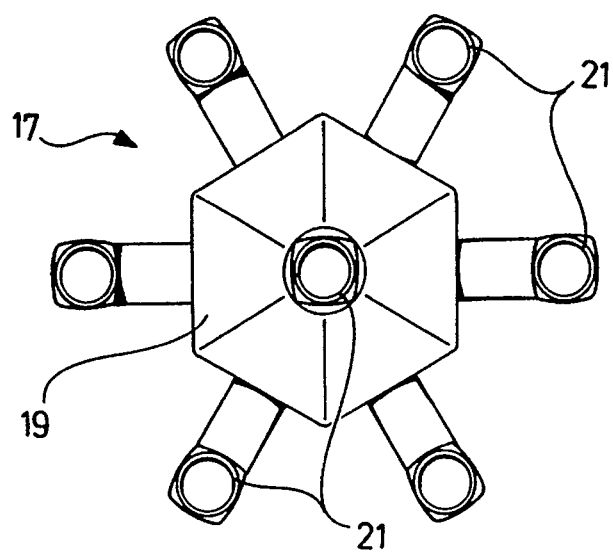
FIG. 2 shows schematically a plan view of a modified pipe system.

FIG. 2 shows a pipe system which is modified in comparison with FIG. 1 and in which, apart from a central individual pipe 21 which is preferably provided, an additional six individual pipes 21 project symmetrically from a common central distributor 19. These individual pipes 21 which are directed vertically upwards parallel to the elongated filter elements 5 are also illustrated in FIG. 3 between a respective three segments 15 of filter elements 5.

As also indicated schematically in FIG. 1, a cleaning device 22 is associated with a respective bundle or segment 15 of filter elements 5 on the surface of the rigid plate 4 facing the clean gas chamber and the relevant filter elements 5 of this segments can be cleaned with this cleaning device when required. The cleaning device 22 is advantageously designed as counterflow ejector which allows the filter elements 5 to be acted upon in a manner known per se with gas pressure pulses directed into the raw gas chamber 3, whereby solid particles which have collected on the filter element 5 are separated so that they fall downwards. These downwardly falling solid particles are not destroyed on their way to the floor of the raw gas chamber by the inflowing raw gas since this likewise has a strong, downwardly directed flow component in the manner described in the area of the filter elements 5. In this way, it is possible to clean some of the segments 15 each time by the cleaning devices 22 in the counterflow while the rest of the segments continue to exercise their filtering function. It has been found that with this specific cleaning procedure the downwardly directed partial streams entering the raw gas chamber 2 from the individual pipes 11 favors the deposition of the dust.

In the embodiments of the invention illustrated in FIGS. 1 and 2, the distributor 9 or 21 is designed as a distributor chamber arranged centrally in the raw gas chamber. In modified embodiments, an annular line arranged peripherally in the raw gas chamber 2 or outside it could be provided instead of such a central distributor chamber, the individual pipes 11 projecting from this line first of all essentially horizontally and then vertically upwards towards the plate 4. In the case of an annular line arranged outside the filter housing 1, branch lines project from this line radially and essentially horizontally through corresponding openings of the housing 1 into its interior.

The filter housing 1 described, with the pipe system 7 serving to uniformly distribute the two-phase flow, is suitable for the cleaning of optional gas-solid mixtures. It is also particularly suitable for the cleaning of hot exhaust gases which can have temperatures of between 100° and 1000°, preferably between 200° and 800° C. The system pressures in the filter housing 1 are preferably between 0.75 and 50, in particular 10 and 35 bar.

We claim:

1. In a filter for separating a two-phase mixture comprising gaseous and solid components, a housing divided by an apertured plate into a lower polluted gas chamber and an upper clean gas chamber, wherein filter elements extending downwardly into the lower chamber are secured in the plate apertures, the upper chamber having an outlet, the combination including means comprising a piping system for introducing the two-phase mixture into the lower chamber, the piping system comprising an inlet disposed below the filter elements and a plurality of vertically extending pipes having outlets in the vicinity of the plate which discharge polluted gas upwardly, and means for deflecting the upward discharge from each pipe downwardly past the filter elements.

2. A filter as in claim 1 wherein the piping system comprises a distributor, the plurality of pipes being coupled to the distributor and having terminal portions extending in a substantially vertical direction toward the plate.

3. A filter as in claim 2 wherein the plate has an axis of symmetry and wherein the distributor is axially disposed.

4. A filter as in claim 3 wherein the plurality of pipes have initial portions extending radially from the distributor.

5. A filter as in claim 1 wherein one of the pipe outlets is in proximity to the plate and the deflecting means comprises the immediately adjacent area of the plate.

6. A filter as in claim 1 wherein the deflecting means comprises a cap disposed above a pipe outlet and having a downwardly extending periphery.

7. A filter as in claim 1 wherein the filter elements are disposed in groups having spaces therebetween and wherein the pipes extend upwardly in said spaces.

8. A filter as in claim 7 further including means for cleaning the filter elements of a group.

9. A filter as in claim 8 wherein the cleaning means includes a counterflow ejector.

10. A filter as in claim 1 wherein the filter elements comprise hollow tubes.

11. A filter as in claim 1 wherein the filter elements comprise ceramic material.

12. A filter as in claim 1 wherein the two-phase mixture has a temperature between approximately 200° C. and approximately 800° C.

13. A filter as in claim 1 wherein the pressure within the housing is between approximately 0.75 bar and approximately 50 bar.

14. A filter as in claim 1 wherein the pressure within the housing is between approximately 10 bar and approximately 35 bar.

* * * * *

UNITED STATES PATENT AND TRADEMARK OFFICE
CERTIFICATE OF CORRECTION

PATENT NO. : 5,514,195
DATED : May 7, 1996
INVENTOR(S) : Michael Durst; Max Muller; Manfred Schnell;
Rudolf Schulze-Dieckhoff; Gerd Minzenbach It is certified that error appears in the above-identified patent and that said Letters Patent is hereby corrected as shown below:

On the title page, insert item

[73]  Assignee:   Schumacher Umwelt- und Trenntechnik GmbH.
Crailsheim, Germany

Signed and Sealed this

Twenty-ninth Day of April, 1997

Attest:

BRUCE LEHMAN

*Attesting Officer*  *Commissioner of Patents and Trademarks*